United States Patent [19]

Hyner et al.

[11] 4,329,402

[45] * May 11, 1982

[54] MICRO-THROWING ALLOY UNDERCOATINGS AND METHOD FOR IMPROVING CORROSION RESISTANCE

[75] Inventors: Jacob Hyner, Waterbury; Stephen Gradowski, Torrington; Thomas F. Maestrone, East Hartford, all of Conn.

[73] Assignee: Whyco Chromium Co., Inc., Thomaston, Conn.

[ * ] Notice: The portion of the term of this patent subsequent to Feb. 12, 1997, has been disclaimed.

[21] Appl. No.: 78,885

[22] Filed: Sep. 25, 1979

Related U.S. Application Data

[63] Continuation-in-part of Ser. No. 946,396, Sep. 27, 1978, Pat. No. 4,188,459.

[51] Int. Cl.$^3$ .......... B32B 15/18

[52] U.S. Cl. .......... 428/621; 204/43 T; 427/405; 428/657; 428/658; 428/659; 428/679; 428/926; 428/935; 411/902

[58] Field of Search .......... 204/43 T, 43 R; 428/657, 658, 659, 679, 621, 926, 935; 427/405; 85/1 C

[56] References Cited

U.S. PATENT DOCUMENTS

| | | | |
|---|---|---|---|
| 2,809,156 | 10/1957 | Safranek | 204/43 T |
| 2,832,729 | 4/1958 | Safranek | 204/43 T |
| 2,840,517 | 6/1958 | Faust | 204/43 T |
| 4,188,459 | 2/1980 | Hyner | 428/648 |

OTHER PUBLICATIONS

Leffler et al., *Plating,* vol. 44 TS670A3, pp. 388–396, Apr. 1957.

Lowenheim, *Modern Electroplating,* TS670E46, Wiley, 2nd Ed., Mar. 1964, pp. 28–29.

*Primary Examiner*—M. J. Andrews

*Attorney, Agent, or Firm*—DeLio and Libert

[57] ABSTRACT

Novel micro-throwing alloy undercoatings, multi-layer coatings containing a novel micro-throwing alloy undercoating and method of improving the corrosion resistance of ferrous metal articles are provided in accordance with the invention. The novel micro-throwing alloy undercoatings are applied as an initial layer over ferrous metal and comprise a layer of alloy having micro-throwing power, such as nickel-cadmium, nickel-zinc, iron-cadmium, iron-zinc, cobalt-cadmium, cobalt-zinc or a ternary or quaternary alloy containing iron, nickel or cobalt in combination with cadmium or zinc. The method comprises application, preferably by electroplating, of a layer of novel micro-throwing alloy undercoating directly over ferrous metal, optionally followed by one or more layers of metallic or organic coatings which further contribute to improved corrosion resistance.

12 Claims, No Drawings

MICRO-THROWING ALLOY UNDERCOATINGS AND METHOD FOR IMPROVING CORROSION RESISTANCE

This application is a continuation-in-part of U.S. patent application Ser. No. 946,396, filed Sept. 27, 1978, now U.S. Pat. No. 4,188,459.

BACKGROUND OF THE INVENTION

The present invention relates to the field of metal plating, and more specifically to novel micro-throwing alloy undercoatings and a method for improving the corrosion resistance of a ferrous metal substrate by utilization of a micro-throwing alloy as the initial layer, or undercoating, applied directly thereover.

A persistant problem in the field has been to provide ferrous metal articles which are resistant to corrosion that inherently attacks such articles in normal usage. With some ferrous metal articles, the need to provide the maximum degree of corrosion resistance is particularly great, in view of the corrosive environments in which they are utilized. For example, metal fasteners which are used extensively in automotive as well as other industrial applications are typically exposed to corrosive salts and other corrosive agents which would cause rapid deterioration, both functionally and aesthetically, of such articles. Numerous other articles made of ferrous metals must be protected or corrosion will eventually occur.

It is well known that the corrosion resistance of ferrous metal articles can be improved by applying metallic coatings, either in single or multiple layers. Such a layer or layers of metal provide either greater inherent resistance to attack by corrosive agents than the ferrous metal substrate, or they are "sacrificial" in that they are preferentially attacked by corrosive agents.

For example, it is known that improvements in the corrosion resistance of a ferrous metal substrate can be achieved by applying separate layers of copper, cadmium, zinc, nickel, tin and like metals and alloys. Organic coatings, such as paints, and dyes, and chromate films have also been used over ferrous metals to improve resistance to corrosion.

However, further improvements in the corrosion resistance of such plated or coated ferrous metal articles is still necessary, particularly in view of the present trend to use such articles over a longer period of time and with exposure to corrosive environments. Improvement is also needed in the reliability with which such multi-layer platings can be applied to ferrous metal articles.

It is particularly difficult to achieve good, reliable corrosion resistance by multi-layer platings on ferrous metal articles which have a rough, uneven surface, such as results from producing the article by heading or stamping operations. The surface of these types of articles can contain pits, laps, cracks, scratches, surface defects and other irregularities which make uniform plating onto the surface difficult. Conventional electrodeposited platings are incapable of completely and uniformly coating such defects, which produce areas of low current density.

SUMMARY OF THE INVENTION

In accordance with the present invention, novel micro-throwing alloy undercoatings are provided to improve the corrosion resistance of ferrous metal substrates. These novel undercoatings, or initial layer applied over the ferrous metal substrate, comprise a layer of an alloy having micro-throwing power. Preferably, the first layer alloy having micro-throwing power is either nickel-cadmium, nickel-zinc, iron-cadmium, iron-zinc, cobalt-cadmium, cobalt-zinc or a ternary or quaternary alloy containing iron, nickel or cobalt in combination with cadmium or zinc.

Furthermore, a method is provided in accordance with the invention for improving the corrosion resistance of a ferrous metal substrate. This method comprises plating, over the ferrous metal substrate, an initial layer, or undercoating layer, of an alloy which has micro-throwing power. Subsequently, one or more other layer or layers of conventional platings or coatings which provide additional corrosion resistance may be applied. Preferably, the aforementioned layers of conventional platings comprising metals or alloys are applied by electroplating. The aforementioned preferred first layer alloys having micro-throwing power are also utilized in accordance with the preferred embodiments of the method of the invention.

It has been discovered that the novel micro-throwing alloy undercoatings and method of the invention provide a reliable, uniform coating of corrosion resistant metal plating, most notably over ferrous metal articles having surface defects, pits, cracks, laps or the like. It is believed that this substantial improvement stems from the micro-throwing power of these alloys and their demonstrated ability to coat, or even fill-in, the surface defect areas, thus providing a uniformly receptive surface for subsequently applied conventional platings and/or coatings.

It is an object of the invention to provide a novel undercoating, or initial layer over a ferrous metal substrate, which facilitates reliable and uniform application of subsequently applied layers of conventional metallic or organic coatings, so as to provide superior corrosion resistance.

It is an object of the invention to provide a novel multi-layer plating which can be reliably and uniformly applied over a ferrous metal substrate, particularly where surface defects are present, and will provide superior corrosion resistance.

It is also an object of the invention to provide a useful and novel method for imparting superior corrosion resistance to a ferrous metal article of superior commerical quality.

Other objects and advantages of the novel micro-throwing alloy undercoatings and method of the invention will be readily apparent to those skilled in the art through the study of the following description of the preferred embodiments and the appended claims.

DETAILED DESCRIPTION OF THE PREFERRED EMBODIMENTS

The metal substrates upon which the novel micro-throwing alloy undercoatings of the invention are applied can be any ferrous metal or alloy thereof. For example, iron and various types of steel are preferably utilized.

It is within the purview of the invention that the type of ferrous metal substrate, or the form in which it is provided for treatment in accordance with the invention, is not limited. The surface of such ferrous metal articles is typically rough and irregular, due to the presence of surface defects, such as pits, cracks, laps, or voids, some of which may be as small as 0.00002 inches.

It is within the purview of the invention that the micro-throwing alloy undercoatings and method can be applied to any article having a ferrous metal substrate, such as steel fasteners, screw machine or eyelet parts, stampings or the like of various shapes and sizes.

While not being limited to any theory or explanation, it is nevertheless believed that the superior corrosion resistance provided in accordance with the invention results in part from the ability of the alloys, which are utilized in the undercoating layer and applied directly over the ferrous metal substrate, to exhibit micro-throwing power and, thus, preferentially plate in surface defects. For purposes of the invention, it is to be understood that "micro-throwing power" refers to the characteristics of an alloy (hereinafter sometimes referred to as a "micro-throwing alloy") to deposit and form a layer which is even thicker inside of the surface defects, seams, pits or the like, than on the plane surface from which the surface defect is formed.

It is within the purview of the invention that the preferred micro-throwing alloys are comprised of a first metal component selected from either iron, cobalt or nickel and a second metal component selected from zinc or cadmium. Preferably, the iron, cobalt or nickel component comprises 95 to 99.9% by weight of the alloy, while the zinc or cadmium component comprises 0.1 to 5.0% by weight. Most preferably, the zinc or cadmium component comprises about 2.5% by weight of the alloy with the iron, cobalt or zinc component comprising the balance.

Preferably, nickel-cadmium, nickel-zinc, iron-cadmium, iron-zinc, cobalt-cadmium and cobalt-zinc alloys are utilized in accordance with the invention. More preferably, nickel-cadmium and nickel-zinc are advantageously utilized. Nevertheless, it is within the full purview of the invention that equivalent alloys which exhibit micro-throwing power can be utilized in accordance with the invention. Furthermore, any ternary or quaternary alloy containing iron, cobalt and/or nickel, as well as zinc and/or cadmium can also be advantageously utilized.

Furthermore, it is within the purview of the invention that the first layer, or undercoating, comprising an alloy having micro-throwing power can be provided in any desired thickness. Preferably, the thickness ranges between 0.0005 to 0.00005 inches.

Following the layer of micro-throwing alloy, it is preferred that one or more layers of a metal which is galvanically protective, or an alloy of such metals, for example cadmium, cadmium-tin alloy, a dual layer of cadmium and tin, zinc or zinc alloy, be applied.

Such galvanically protective metals and alloys must effectively cover the entire surface of the ferrous metal substrate, or any coating layer applied over the substrate. Otherwise, localized corrosion will occur. Once corrosion begins, its spread is most difficult, if not impossible, to prevent. The nature of galvanically protective metals is such that they will not electrodeposit will, if at all, into the aforementioned surface defects, which constitute areas of low current density.

However, it has been advantageously discovered that, in accordance with the invention, such galvanically protective metals and alloys can be reliably and uniformly electrodeposited over ferrous metal substrates upon which a layer of micro-throwing alloy has been applied as the initial layer, or undercoating. Apparently, this is facilitated by the ability of the novel micro-throwing alloy undercoatings of the invention to deposit within, or even completely fill, surface defects which would otherwise constitute areas of low current density. These sites, following application of a layer of micro-throwing alloy, no longer constitute areas of low current density. Consequently, this allows for subsequent layers of metal or alloy to be uniformly and reliably deposited thereover. Thus, it is possible to obtain the desired coverage of the entire surface of the ferrous metal substrate by galvanically protective platings.

Since it is preferred that the micro-throwing alloy comprising the initial layer be applied by electrodeposition, conventional electroplating baths and techniques are employed. For example, nickel-cadmium alloys can be electroplated from sulfate or sulfate-chloride type baths, as are conventionally known and commercially available. Likewise, nickel-zinc alloys can be plated from chloride, sulfate, sulfamate, ammonical or pyrophosphate type baths. Iron-zinc and iron-cobalt can be plated from chloride or sulfate type baths. Cobalt-zinc or cobalt-cadmium alloys can be plated from sulfate or ammonical type baths. It is within the purview of the invention that any suitable plating bath or solution capable of depositing micro-throwing alloys can be utilized by one skilled in the art.

Likewise, the other metallic layers can each be applied by conventional baths and method for the respective metal or alloy utilized.

For example, the following bath formulations are among those which can be used, as required, to plate the desired metal or alloy layer.

| | |
|---|---|
| Nickel-Cadmium Alloy Bath | |
| $NiSO_4 \cdot 7H_2O$ | 350 g/l |
| $NiCl_2 \cdot 6H_2O$ | 45 g/l |
| Boric Acid | 40 g/l |
| Gelatin | 5 g/l |
| Cadmium Sulfate | 1.08-3.6 g/l |
| Operating Conditions | |
| Temperature | 57° C. |
| Current Density | 16 amp/dm$^2$ |
| pH | about 6.0 |
| Nickel-Zinc Alloy Bath | |
| $NiCl_2 \cdot 6H_2O$ | 300 g/l |
| $ZnCl_2$ | 155 g/l |
| Plating Conditions | |
| Temperature | 75° C. |
| Current Density | 0.05 amp/dm$^2$ |
| pH | 2.3 |
| Iron-Zinc Alloy Bath | |
| $FeSO_4 \cdot 7H_2O$ | 250 g/l |
| $ZnSO_4 \cdot 7H_2O$ | 26 g/l |
| Plating Conditions | |
| Temperature | 90° C. |
| Current Density | 2 amp/dm$^2$ |
| pH | Acid 0.01N |
| Cadmium Bath | |
| Cadmium Oxide | 31.5 g/l |
| Sodium Cyanide | 142.3 g/l |
| Plating Conditions | |
| Temperature | 23.9-32.2° C. |
| Current Density | 0.5-16.2 amp/dm$^2$ |
| Copper Bath | |
| Copper Metal | 30 g/l |
| Sodium Cyanide | 15 g/l |
| Rochelle Salts | 40 g/l |
| Sodium Copper Cyanide | 43 g/l |
| Plating Conditions | |
| Temperature | 60° C. |
| pH | 9.8-10.5 |
| Current Density | 0.05-21.5 amp/dm$^2$ |
| Nickel Bath | |
| Nickel Metal | 45 g/l |
| Chloride | 20 g/l |

-continued

| | |
|---|---|
| Boric Acid | 45 g/l |
| Plating Conditions | |
| Temperatures | 60° C. |
| pH | 4.0–4.5 |
| Current Density | 0.05–21.5 amp/dm$^2$ |
| Zinc Bath | |
| (Commercially available from Minnesota Mining and Manufacturing Company, St. Paul, Minnesota under trade name "Kenlevel II") | |
| Conc. zinc chloride | 101.86 g/l |
| Potassium Chloride | 224.7 g/l |
| Boric Acid | 33.7 g/l |
| Kenlevel II TB | 29.96 g/l |
| Kenlevel II TM | 0.26 ml/l |
| Plating Conditions | |
| Temperature | 26.7° C. |
| pH | 5.0 |
| Current Density | 3.2 amp/dm$^2$ |
| Tin Bath | |
| Potassium stannate | 104.86 g/l |
| Potassium hydroxide (free) | 39.7 g/l |
| Sodium hydroxide (free) | 14.98 g/l |
| Plating Conditions | |
| Temperature | 71° C. |
| Current Density | 3.2 amp/dm$^2$ |

It is to be understood that it is fully within the purview of the invention that the novel micro-throwing alloy undercoatings may advantageously be used alone, (i.e. without any corrosion resistant coatings applied thereover), to obtain a degree of corrosion resistance over a ferrous metal substrate. However, in order to obtain the maximum utility of the novel undercoatings of the invention, it is preferred that one or more layers of metallic or organic coatings, each of which contribute to an addition degree of corrosion resistance, be applied over the undercoatings of the invention.

Furthermore, it is fully within the purview of the invention that the sequential arrangement and selection of the layer or layers of such metallic or organic coatings applied over the initial layer, or undercoating, of the micro-throwing alloys of the invention can be modified within the skill of one in the art and is without limitation.

In some applications it may be desirable to apply conventional chromate film over the novel undercoating layer of the invention. For example, a ferrous metal article undercoated with a layer of micro-throwing alloy of the invention, followed either with or without one or more layers of galvanically protective metal, can be subsequently dipped in an acidic solution containing hexavalent chromium and conventional activators and catalysts. The resulting chromate film further contributes to the overall corrosion resistance of the treated ferrous metal article, and can also improve the adhesion of any subsequently applied layer of paint or other organic coating.

Furthermore, a layer of any non-metallic organic coating, preferably a paint or metal dye, can also be applied over a ferrous metal article undercoated with a layer of micro-throwing alloy, followed either with or without one or more layers of galvanically protective metals. Conventional formulations of such organic coatings and conventional application techniques may be employed, with a substantially continuous film or coating being applied. The thickness of such organic coating is not limited and can be varied to obtain the desired level of protection.

For purposes of this invention, reference to a "non-metallic" layer or coating includes, but is not limited to, layers, coatings, films or the like which, while being formed from a non-metallic substance, may nevertheless include some metal, usually in the form of metal particles, flakes, chips or the like. For example, "metallic paints" which may contain particles dispersed therein can be used to provide a "non-metallic" layer or coating in accordance with the invention.

The organic coatings which may be utilized in accordance with the invention include, but are not limited to any thermosetting, thermoplastic or non-polymeric films, and preferably may be any conventional paint formulation. Preferred paints are those having either a thermosetting phenolic resin, alkyd, epoxy, melamine or acrylic base. Most preferably, paints having a thermosetting resin base are utilized. These paints may be applied by any conventional technique including, but not limited to dipping and spinning, spraying, rolling, brushing or like method of application.

In accordance with the one illustrative embodiment of the invention, a thermosetting phenolic resin base paint can be applied, by dipping and spinning, on a ferrous metal article, which has an initial layer of micro-throwing alloy and a subsequent layer of galvanically protective metal or alloy previously applied to it. The article is than baked at about 300°–400° F. for approximately 15–30 minutes. Other types of paints, such as lacquers and acrylic paints, may be air dried.

The metal dyes which may be utilized in accordance with the invention include any conventional dye which may be utilized on metals. Various types of proprietary commercial metal dyes are available and can be applied using conventional techniques.

EXAMPLES

In accordance with the method of the invention, several steel fasteners were electroplated with an initial layer, or undercoating, of nickel-cadmium micro-throwing alloy. The steel fasteners were made cathodic and electroplated using the aforementioned nickel-cadmium plating bath. The resulting layer of nickel-cadmium alloy comprised between about 2.5% by weight of cadmium and was electroplated to a thickness of about 0.00025 inches. A series of these undercoated fasteners were then subsequently plated with the respective layer or layers of galvanically protective metals and/or organic coatings and subjected to a 5% Neutral Salt Spray resistance test (ASTM B117). These results were compared with similarly coated fasteners which lacked the initial undercoating layer of micro-throwing alloy.

The following examples are intended to be illustrative of the invention and are not limiting.

EXAMPLE 1

Several steel fasteners having micro-throwing alloy undercoating were electroplated with 0.00030 inches of zinc, using the aforementioned conventional zinc plating bath and operating conditions (i.e. Kenlevel II). Several "control" fasteners, (i. e. without an undercoating layer of micro-throwing alloy), were likewise plated with 0.00030 inches of zinc using the same bath and plating conditions.

Both sets of fasteners were subjected to 5% Neutral Salt Spray testing, with the results set forth in Table I below. A substantially superior degree of corrosion resistance was clearly demonstrated by the fasteners which were undercoated with the novel micro-throwing alloy undercoatings of the invention.

EXAMPLE 2

Example 1 was repeated, except that instead of a layer of zinc, a 0.00030 inch layer of cadmium was applied, using the aforementioned cadmium bath. The comparative performance of these fasteners in 5% Neutral Salt Spray testing, is also set forth in Table I, below. Again, the fasteners having micro-throwing alloy undercoatings exhibited a superior level of resistance to corrosion.

EXAMPLE 3

Example 1 was again repeated, except that a uniform layer of a thermosetting, phenolic paint, (which was commercially available from R. O. Hull Company under the trade name "Polyseal") was applied over the plated zinc layers on both the fasteners plated with the micro-throwing alloy and zinc and the "control" fasteners plated with zinc alone. The superior performance of the fasteners undercoated with a layer of micro-throwing alloy in accordance with the invention is likewise set forth in Table 1, below.

EXAMPLE 4

Example 3 was repeated, except that a chromate film was applied over both sets of fasteners. The chromate film was applied from a commercially available bath supplied by Minnesota Mining and Manufacturing Company under the trade name "Kenvert No. 5". The superior performance of the fasteners undercoated with a layer of micro-throwing alloy is likewise decumented in Table 1.

EXAMPLE 5

Example 2 was repeated, except that a 0.00005 inch layer of tin was electroplated over the cadmium platings on both sets of fasteners. The aforementioned conventional cadmium bath was used. The superior performance of the fasteners undercoated in accordance with the invention is also set forth in Table 1, below.

TABLE 1

| Example No. | Sequence of Coatings Applied | Time to Red Rust (Hrs.) |
|---|---|---|
| 1 | Nickel-Cadmium micro-throwing alloy/Zinc | 340 |
| | Zinc alone | 160 |
| 2 | Nickel-Cadmium micro-throwing alloy/Cadmium | 265 |
| | Cadmium alone | 80 |
| 3 | Nickel-Cadmium micro-throwing alloy/Zinc/paint | 550 |
| | Zinc/paint | 240 |
| 4 | Nickel-Cadmium micro-throwing alloy/Zinc/Chromate | 418 |
| | Zinc/Chromate | 172 |
| 5 | Nickel-Cadmium micro-throwing alloy/Cadmium/Tin | 650 |
| | Cadmium/Tin | 194 |

As will be readily apparent to one skilled in the art, various modifications may be made in the details of the method and novel micro-throwing alloy undercoatings of the invention, so as to provide an improved and reliably uniform degree of corrosion resistance to a ferrous metal substrate. As indicated previously, various conventional methods of plating the various metallic compositions for each of the metals and alloys utilized as layers of the multi-layer plating may be utilized, including but not limited to electroplating, electrolessplating and other conventional application techniques. Of course, it is fully within the purview of the invention that the form of the ferrous metal substrate upon which the novel multi-layer plating of the invention can be applied can comprise any article of manufacture which can be formed therefrom and which will benefit from the superior corrosion resistance provided by the invention.

While the invention has been illustrated and described in what are presently considered to be the most practical and preferred embodiments, it will be recognized that many other variations are possible and come within the scope thereof. The appended claims are, therefore, entitled to a full range of equivalents.

What is claimed is:

1. A multi-layer plated article comprising a ferrous metal substrate having thereon a coating for improving the corrosion resistance of said article comprising;

(a) a layer of nickel-cadmium alloy comprising 95 to 99.9% by weight nickel and 0.1 to 5.0% by weight cadmium, said alloy being characterized by the ability to be electrodeposited upon said substrate to form a layer which is thicker inside of surface defects thereon than on the plane surface in which the defect is formed, said layer of nickel-cadmium alloy being applied directly over said substrate and having a thickness which ranges from about 0.005 to 0.00005 inches, and (b) at least one coating which contributes to further improving the corrosion resistance of said ferrous metal substrate, said coating being applied over said layer of nickel-cadmium alloy and being selected from (1) a galvanically protective metal or alloy selected from the group consisting of cadmium and tin, zinc or zinc alloy, (2) alloys of (1), (3) paints, (4) metal dyes, or (5) a chromate film.

2. The article of claim 1 wherein the thickness of said nickel-cadmium alloy is about 0.0002 inches.

3. The article of claim 1 wherein two layers of said coating which contribute to further improving corrosion resistance are provided comprising, in sequence over said layer of nickel-cadmium alloy;

(a) a first layer of coating selected from (1) a galvanically protective metal or alloy selected from cadmium, tin, cadmium-tin alloy, a dual layer of cadmium and tin, zinc or zinc alloy, or (2) alloys of (1), and (b) a second layer of coating deposited over said first layer and selected from paints, metal dyes and chromate film.

4. The article of claim 1 wherein the thickness of each respective layer of said coating, applied over said layer of nickel-cadmium alloy ranges between about 0.001 to 0.0001 inches.

5. An article having a ferrous metal substrate and improved corrosion resistance comprising, in sequence;

(a) ferrous metal as the structural base of said article, (b) a layer of nickel-cadmium alloy comprising 95 to 99.9% by weight nickel and 0.1 to 5.0% by weight cadmium, said alloy being characterized by the ability to be electrodeposited upon said substrate to form a layer which is thicker inside of surface defects thereon than on the plane surface in which the defect is formed, said layer of nickel-cadmium alloy being applied directly over said ferrous metal and having a thickness which ranges from about 0.005 to 0.00005 inches; and (c) at least one layer of coating which contributes to further improving the corrosion resistance of said ferrous metal, wherein said coating is selected from the group consisting of cadmium, tin, cadmium-tin alloy, a dual layer of cadmium and tin, zinc or zinc alloy, (2) alloys of (1), (3) paints, (4) metal dyes or (5) a chromate film.

6. The article of claim 5 wherein the thickness of said alloy having micro-throwing power is about 0.0002 inches.

7. The article of claim 5 wherein two layers of coating which contribute to further improving corrosion resistance are provided comprising, in sequence over said layer of alloy having micro-throwing power;

(a) a first layer of coating selected from (1) a galvanically protective metal or alloy selected from cadmium, tin, cadmium-tin alloy, a dual layer of cadmium and tin, zinc or zinc alloy or (2) alloys of (1), and (b) a second layer of coating deposited over said first layer and selected from paints, metal dyes, and chromate film.

8. The article of claim 5 wherein the thickness of each respective layer of said coating applied over said layer of nickel-cadmium alloy ranges between about 0.001 to 0.0001 inches.

9. A method of improving the corrosion resistance of an article having a ferrous metal substrate which comprises electroplating a layer of nickel-cadmium alloy comprising 95 to 99.9% by weight nickel and 0.1 to 5.0% by weight cadmium, said alloy being characterized by the ability to be electrodeposited upon said substrate to form a layer which is thicker inside of surface defects thereon than on the plane surface in which the defect is formed, said layer of nickel-cadmium alloy being applied over said ferrous metal substrate and having a thickness which ranges from about 0.005 to 0.00005 inches, and applying over said layer of nickel-cadmium alloy at least one layer of coating which contributes to further improving the corrosion resistance of said ferrous metal substrate and is selected from (1) a galvanically protective metal or alloy selected from the group consisting of cadmium, tin, cadmium-tin alloy, a dual layer of cadmium and tin, zinc or zinc alloy, (2) alloys of (1), (3) paints, (4) metal dyes, or (5) a chromate film.

10. The method of claim 9 wherein the thickness of said nickel-cadmium alloy is about 0.0002 inches.

11. The method of claim 9 including applying over said layer of nickel-cadmium alloy two layers of coating which contribute to further improving corrosion resistance said two layers respectively comprising, in sequence over said layer of alloy having microthrowing power;

(a) a first layer of coating selected from (1) a galvanically protective metal or alloy selected from cadmium, tin, cadmium-tin alloy, a dual layer of cadmium and tin, zinc or zinc alloy or (2) alloys of (1), and (b) a second layer of coating applied over said first layer of coating and selected from paints, metal dyes, and chromate film.

12. The method of claim 9 wherein the thickness of each respective layer of said coating applied over said layer of nickel-cadmium alloy ranges between about 0.001 to 0.0001 inches.

* * * * *

UNITED STATES PATENT AND TRADEMARK OFFICE
CERTIFICATE OF CORRECTION

PATENT NO. : 4,329,402

DATED : May 11, 1982

INVENTOR(S) : Jacob Hyner et al.

It is certified that error appears in the above-identified patent and that said Letters Patent is hereby corrected as shown below:

Column 8, line 28, "0.005" should read -- 0.0005 --.

Signed and Sealed this

*Fourteenth* Day of *June 1983*

[SEAL]

*Attest:*

DONALD J. QUIGG

*Attesting Officer* *Acting Commissioner of Patents and Trademarks*